United States Patent
Yagi et al.

(10) Patent No.: US 10,590,956 B2
(45) Date of Patent: Mar. 17, 2020

(54) STATOR-VANE STRUCTURE AND TURBOFAN ENGINE EMPLOYING THE SAME

(71) Applicant: IHI CORPORATION, Koto-ku (JP)

(72) Inventors: Hiroyuki Yagi, Koto-ku (JP); Rintarou Kajiwara, Koto-ku (JP); Takaomi Inada, Koto-ku (JP); Tomonori Enoki, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 301 days.

(21) Appl. No.: 15/468,693

(22) Filed: Mar. 24, 2017

(65) Prior Publication Data

US 2017/0198718 A1  Jul. 13, 2017

Related U.S. Application Data

(63) Continuation of application No. PCT/JP2015/077962, filed on Oct. 1, 2015.

(30) Foreign Application Priority Data

Oct. 7, 2014  (JP) ................. 2014-206430

(51) Int. Cl.
*F04D 29/54* (2006.01)
*F02K 3/06* (2006.01)
(Continued)

(52) U.S. Cl.
CPC ............. *F04D 29/542* (2013.01); *F01D 9/04* (2013.01); *F01D 11/008* (2013.01); *F02C 7/00* (2013.01);
(Continued)

(58) Field of Classification Search
CPC .... F04D 29/542; F04D 19/002; F01D 11/008; F01D 9/04; F02C 7/00; F02K 3/06;
(Continued)

(56) References Cited

U.S. PATENT DOCUMENTS 3,335,483 A    8/1967  Howald
5,890,874 A *  4/1999  Lambert ............... F01D 11/008
                                           416/193 A
(Continued)

FOREIGN PATENT DOCUMENTS

EP    2 075 414 A1   7/2009
JP    2004-92612     3/2004
(Continued)

OTHER PUBLICATIONS

International Search Report dated Dec. 22, 2015 in PCT/JP2015/077962, filed on Oct. 1, 2015(with English Translation).

*Primary Examiner* — J. Todd Newton
(74) *Attorney, Agent, or Firm* — Oblon, McClelland, Maier & Neustadt, L.L.P.

(57) ABSTRACT

A stator-vane structure that can suppress pressure loss caused by a gap or a level difference between liners, while forming an air channel with stator vanes made of a composite material and the liners in a turbofan engine, and the turbofan engine employing this stator-vane structure are provided. Inner liners are made to butt against each other so as to clamp therebetween a vane base section of a fan exit guide vane (stator vane) made of a composite material, outer liners are made to butt against each other so as to clamp therebetween a vane tip section of the fan exit guide vane, respectively, and division lines that are formed between these liners on a leading-edge side are made to be along a streamline direction.

7 Claims, 6 Drawing Sheets

(51) Int. Cl.
*F01D 11/00* (2006.01)
*F01D 9/04* (2006.01)
*F02C 7/00* (2006.01)
*F04D 19/00* (2006.01)

(52) U.S. Cl.
CPC .............. F02K 3/06 (2013.01); F04D 19/002 (2013.01); *F05D 2220/32* (2013.01); *F05D 2220/36* (2013.01); *F05D 2240/12* (2013.01); *F05D 2240/121* (2013.01); *Y02T 50/672* (2013.01)

(58) Field of Classification Search
CPC ............. F05D 2220/36; F05D 2220/32; F05D 2240/121; F05D 2240/12; Y02T 50/672
USPC ...................................................... 415/210.1
See application file for complete search history.

(56) References Cited

U.S. PATENT DOCUMENTS

| | | | | |
|---|---|---|---|---|
| 6,514,045 | B1* | 2/2003 | Barton | ...................... F01D 5/22 416/193 A |
| 7,153,099 | B2 | 12/2006 | Queriault et al. | |
| 7,942,636 | B2* | 5/2011 | Evans | ................... F01D 11/008 416/193 R |
| 2003/0049129 | A1* | 3/2003 | Scott | ..................... F01D 11/006 416/193 A |
| 2005/0276691 | A1 | 12/2005 | Queriault et al. | |
| 2009/0053037 | A1 | 2/2009 | Marini et al. | |
| 2009/0317246 | A1 | 12/2009 | Lutz et al. | |
| 2010/0077612 | A1* | 4/2010 | Tudor | ................... F01D 11/005 29/889.22 |
| 2010/0080692 | A1* | 4/2010 | Tudor | ..................... F01D 9/042 415/139 |
| 2011/0037233 | A1* | 2/2011 | Harper | .................. F01D 11/008 277/551 |
| 2011/0229326 | A1* | 9/2011 | Papin | ..................... F01D 9/041 416/179 |
| 2017/0198718 | A1* | 7/2017 | Yagi | ......................... F01D 9/04 |

FOREIGN PATENT DOCUMENTS

| | | |
|---|---|---|
| JP | 2008-32001 A | 2/2008 |
| JP | 2011-85056 | 4/2011 |
| RU | 2 299 992 C2 | 1/2006 |

* cited by examiner

STATOR-VANE STRUCTURE AND TURBOFAN ENGINE EMPLOYING THE SAME

TECHNICAL FIELD

Embodiments described herein relate to a stator-vane structure that connects an engine body section side and a fan case of a turbofan engine for an aircraft, for example.

BACKGROUND ART

The turbofan engine as described above is conventionally provided with rotor blades that introduce air into an engine body section, and stator vanes that straighten a flow of the air introduced by the rotor blades. The stator vanes may only be required to have a flow straightening function, or may be required to have also a structural function to connect a fan frame which constitutes the engine body section and a fan case, in addition to the flow straightening function.

Such multiple stator vanes are provided side by side in a circumferential direction, and shrouds extending in the circumferential direction are formed on end sections of the respective stator vanes so that the shrouds of the respective stator vanes are made to butt against each other.

Here, in the case of turbine stator vanes, hot gas flows in a channel formed by the stator vanes and the shrouds. If there is a portion where hot gas hits substantially perpendicularly on end surfaces where the shrouds are made to butt against each other, corrosion due to high-temperature oxidation may be caused in such a portion.

Consequently, a configuration has been developed in which the end surfaces at a joint portion between the shrouds have shapes along a streamline of the hot gas, which is determined by guide vanes, so that a portion where the hot gas collides from a perpendicular direction on the shroud end surface on a suction side of the guide vane is reduced in order to reduce a portion subject to the high-temperature oxidation (see Patent Document 1).

RELATED ART DOCUMENT

Patent Document

Patent Document 1: Japanese Patent Laid-Open No. 2004-92612

SUMMARY OF THE DISCLOSURE

Problems to Be Solved by the Disclosure

The turbine stator vane as described in the above Patent Document 1 is for straightening the hot gas and is made of a unitary material. To that end, both end sections of such a stator vane are formed integrally with the shrouds. In contrast, the stator vane may be separated into a vane section requiring sufficient stiffness and strength and shroud sections not requiring high stiffness and strength, by using different materials, in order to provide weight saving and cost reduction. In particular, for the stator vane that is also required to have the structural function in addition to the flow straightening function, for example, if a fan exit guide vane is made to have the structural function, the vane section is required to have stiffness and strength as a structure, in addition to an aerodynamic load. Thus, the effects of weight saving and cost reduction are particularly significant.

Consequently, instead of the shrouds as in Patent Document 1, a configuration has been developed with separate liners (fairings) provided between the respective stator vanes to form an air channel. Such liners are provided to butt against each other so as to clamp therebetween the stator vane from a suction side and a pressure side, and division lines are thus formed at a leading edge and a trailing edge of the stator vane.

However, in particular, while a leading-edge side of the stator vane is aerodynamically significant, a gap or a level difference on the leading-edge side of the stator vane will cause a vortex, which leads to a problem of causing pressure loss.

At least one embodiment of the present disclosure has been accomplished to solve such a problem, and an object of the present disclosure is to provide a stator-vane structure that can suppress the pressure loss caused by the gap or the level difference between the liners, while forming the air channel with the stator vanes and the liners in the turbofan engine, and to provide the turbofan engine employing this stator-vane structure.

Means for Solving the Problems

In order to achieve the above object, a stator-vane structure according to at least one embodiment of the present disclosure includes a fan case of a turbofan engine; an engine body section of the turbofan engine; multiple stator vanes that connect the fan case and the engine body section; and multiple liners that form a channel surface between end sections of the stator vanes that are adjacent to each other, wherein the liners that are adjacent to each other are made to butt against each other so as to clamp therebetween the stator vane, and a division line that is formed between the liners on a leading-edge side of the stator vane is along a streamline direction.

Effects of the Disclosure

According to at least one embodiment of the present disclosure with the above described measures, it is possible to suppress the pressure loss caused by the gap or the level difference between the liners, while forming the air channel with the stator vanes made of a composite material and the liners.

MODE FOR CARRYING OUT THE DISCLOSURE

An embodiment of the present disclosure will be described below based on the drawings.

Figure 1:
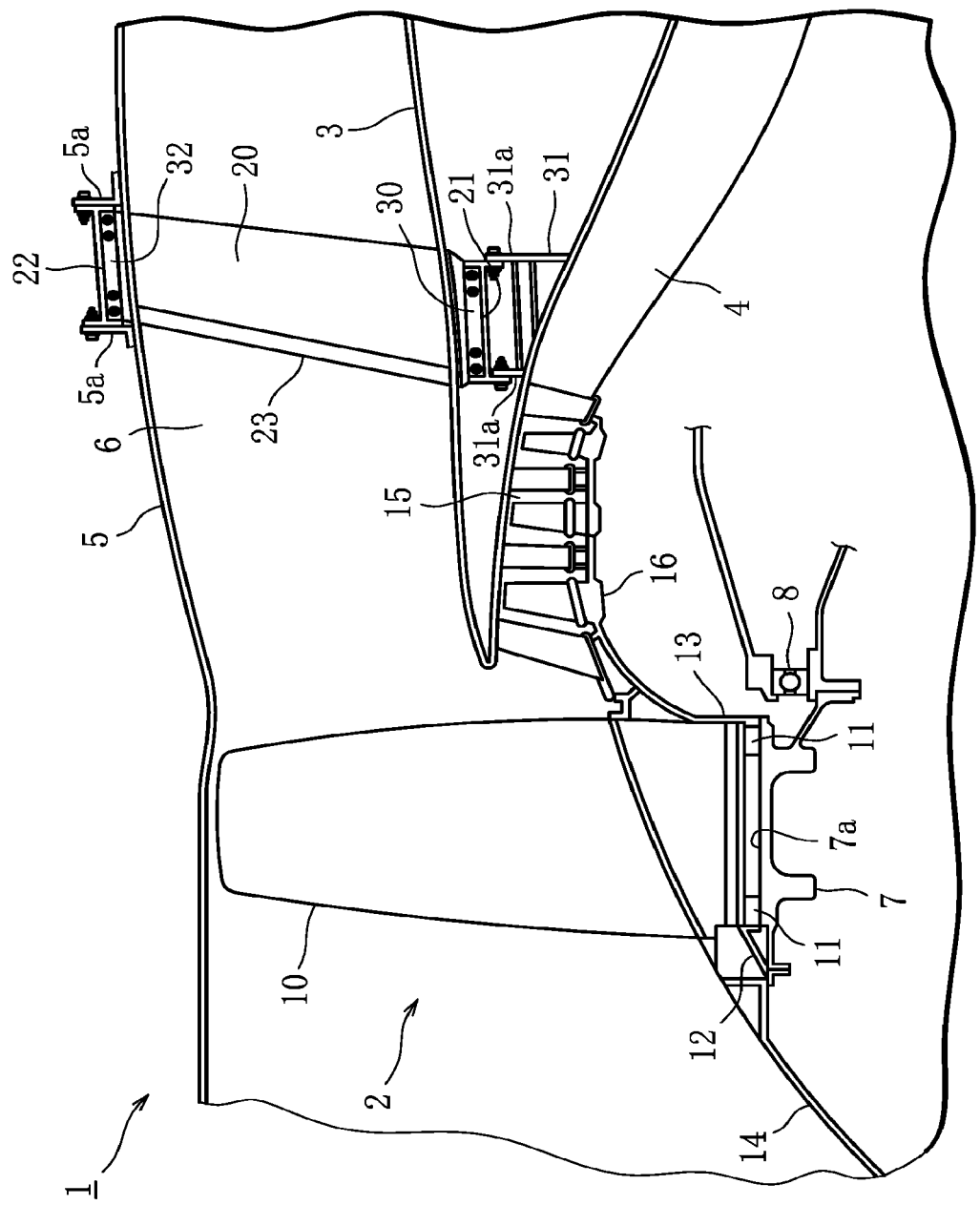
FIG. 1 is a partial cross-sectional view of a front upper section of a turbofan engine employing a stator-vane structure according to an embodiment of the present disclosure.

FIG. 1 illustrates an embodiment of a stator-vane structure according to the present disclosure. This embodiment will be described with fan exit guide vanes as stator vanes constituting a turbofan engine, by way of example.

As illustrated in FIG. 1, in a turbofan engine 1 (hereinafter simply referred to as "engine 1"), an annular core channel 4 is formed on an axial center side of an engine inner cylinder 3 in an engine body section 2, while a bypass channel 6 (air channel) is formed between an inner peripheral surface of a fan case 5 that is an outside portion of the engine body section 2 and an outer peripheral surface of the engine inner cylinder 3.

In a front section of this engine 1, which is an upstream side (left side in the figure) of an airflow, a fan disc 7 is installed rotatably around an engine axial center (not shown) via a bearing 8. This fan disc 7 is integrally connected with a turbine rotor in a low-pressure turbine (not shown) placed in a rear section of the engine 1, which is a downstream side (right side in the figure) of the airflow.

Moreover, on an outer peripheral surface of this fan disc 7, multiple rotor blades 10 are equally spaced in a circumferential direction via fit grooves 7a, and spacers 11, 11 are placed at front and rear sections between each rotor blade 10 and each fit groove 7a. At the front section and the rear section of the fan disc 7, annular retainers 12, 13 that support the rotor blades 10 are installed integrally in the circumferential direction, respectively. The retainer 12 at the front section is connected integrally with a nose cone 14, while the retainer 13 at the rear section is connected coaxially and integrally with a rotor 16 in a low-pressure compressor 15 adjacent to the downstream side of the fan disc 7.

In operation of the engine 1, the multiple rotor blades 10 are rotated with the fan disc 7 so as to introduce air into the core channel 4 and the bypass channel 6.

This engine 1 is provided with multiple fan exit guide vanes 20 within the bypass channel 6. The multiple fan exit guide vanes 20 are placed around the engine inner cylinder 3 so as to straighten a swirling airflow flowing in the bypass channel 6. For this fan exit guide vane 20, while a metallic material, such as a titanium alloy or an aluminum alloy, or a composite material combining a thermosetting resin or a thermoplastic resin and carbon fibers or glass fibers or the like is employed, the case of employing the composite material for the stator vane is illustrated in this figure.

A vane base section 21 on the axial center side (inner side) of this fan exit guide vane 20 is connected to mounting flanges 31a, 31a of a fan frame 31 placed to the engine inner cylinder 3, via a coupling support member 30.

Moreover, a vane tip section 22 on a side away from the axial center (outer side) of the fan exit guide vane 20 is connected to mounting flanges 5a, 5a placed on the fan case 5, via a coupling support member 32.

Moreover, on a surface of a leading-edge portion of the fan exit guide vane 20, a sheath 23, which is a metal for erosion prevention, is provided so as to prevent the stator vane from wearing due to collision of objects or the like. The sheath 23 is, for example, a titanium alloy plate material, and is adhered so as to cover a leading-edge end of the fan exit guide vane 20.

Figure 2:
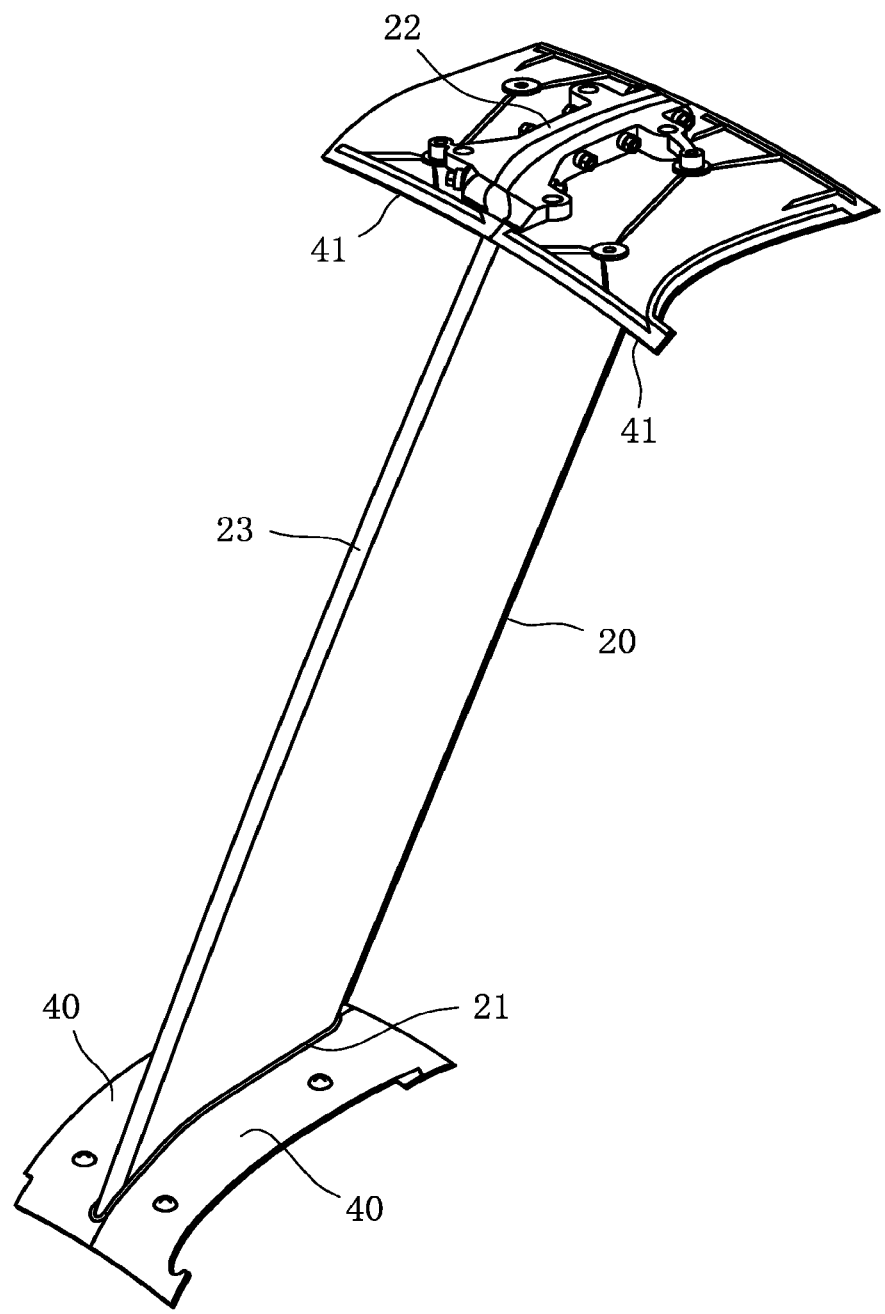
FIG. 2 is an overall perspective view of a fan exit guide vane.
Figure 3A:
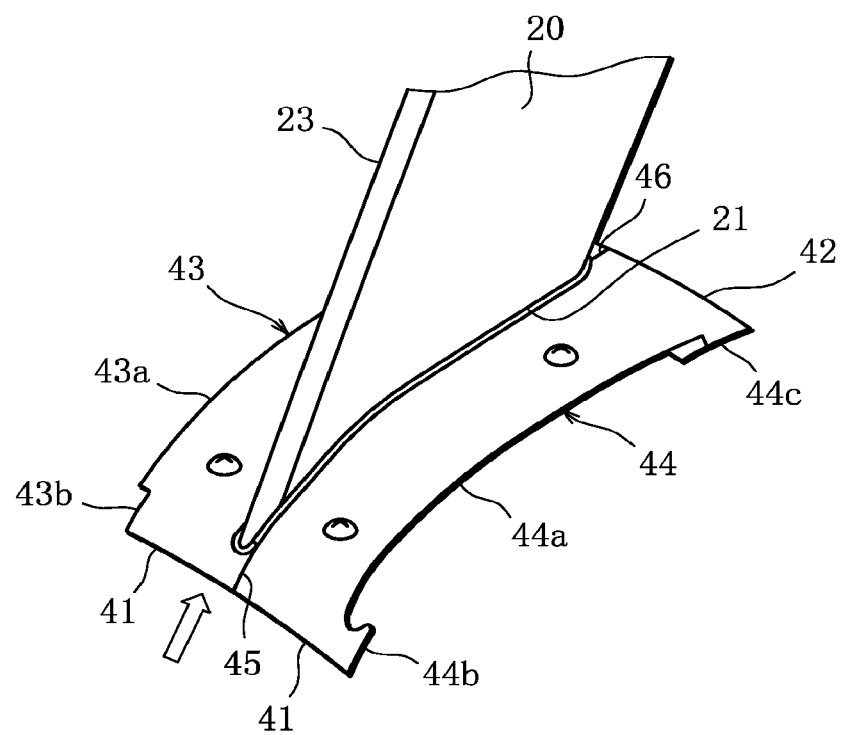
FIG. 3A is an enlarged perspective view of a vane base section of the fan exit guide vane in FIG. 2.
Figure 3B:
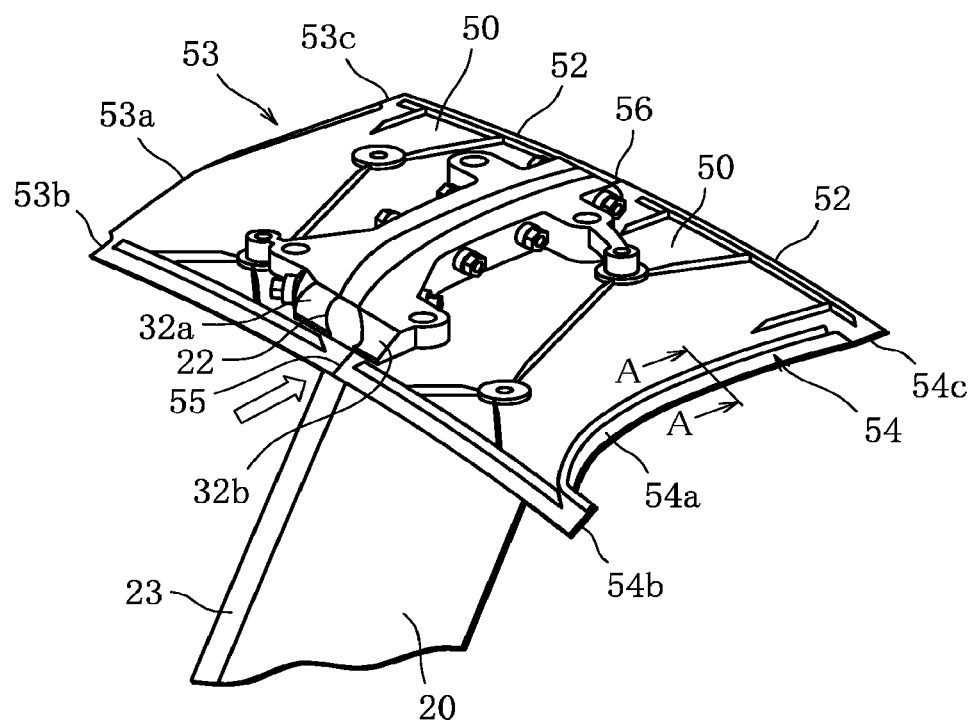
FIG. 3B is an enlarged perspective view of a vane tip section of the fan exit guide vane.

Here, FIG. 2 illustrates an overall perspective view of the fan exit guide vane 20, FIG. 3A illustrates an enlarged perspective view of the vane base section 21 of the fan exit guide vane 20, and FIG. 3B illustrates an enlarged perspective view of the vane tip section 22 of the fan exit guide vane 20, respectively. A liner structure of the fan exit guide vane 20 will be described below in detail based on these figures.

While FIG. 2 illustrates one fan exit guide vane 20 as a representative, each of the multiple fan exit guide vanes 20 provided in the engine 1 is provided with inner liners 40 extending in the circumferential direction between the fan exit guide vanes 20, at the vane base section 21, and is provided with outer liners 50 extending in the circumferential direction between the fan exit guide vanes 20 positioned side by side, at the vane tip section 22. Each of the inner liners 40 constitutes a part of the engine inner cylinder 3, and each of the outer liners 50 constitutes a part of the fan case 5. In other words, the inner liners 40 and the outer liners 50 form parts of a channel surface of the bypass channel 6.

Specifically, as illustrated in FIG. 3A, at the vane base section 21 of the fan exit guide vane 20, a pair of the inner liners 40, 40 is made to butt against each other so as to clamp therebetween the fan exit guide vane 20 from a vane thickness direction. One inner liner 40 has an approximately rectangular shape having four sides: a front side 41 on the airflow upstream side, a rear side 42 on the downstream side, a pressure-side side 43 in contact with a pressure-side of the fan exit guide vane 20, and a suction-side side 44 in contact with a suction-side. The pressure-side side 43 and the suction-side side 44 consist of abutting sections 43a, 44a abutting the fan exit guide vane 20, leading-edge sections 43b, 44b positioned closer to a leading-edge side than the fan exit guide vane 20, and trailing-edge sections 43c, 44c positioned closer to a trailing-edge side than the fan exit guide vane 20, respectively.

The abutting section 44a on the suction-side side 44 has a curved shape along a surface shape of the suction side of the fan exit guide vane 20, in which the leading-edge side surrounds a leading edge of the fan exit guide vane 20 to slightly wrap around the pressure side. The other abutting section 43a on the pressure-side side 43 curves along a surface shape of the pressure side of the fan exit guide vane 20, except a portion that the abutting section 44a on the suction-side side 44 partially wraps around.

Then, in a state where the pair of the inner liners 40, 40 is made to butt against each other so as to clamp therebetween the fan exit guide vane 20, the both leading-edge sections 43b, 44b on the pressure-side side 43 and the suction-side side 44 are made to butt against each other so as to form a leading-edge division line 45, and the both trailing-edge sections 43c, 44c are made to butt against each other so as to form a trailing-edge division line 46. The leading-edge division line 45 extends to the front sides 41 from a position offset from the leading edge to the pressure side of the fan exit guide vane 20, in parallel with a line made of a vane chord line of the fan exit guide vane 20 which is extended to the leading-edge side, that is, along a streamline direction. For an amount of offset of this leading-edge division line 45 from the leading edge to the pressure side of the fan exit guide vane 20, an intersection between the leading-edge division line 45 and a vane surface of the fan exit guide vane 20 is more than or equal to 1.0% and less than or equal to 10.0% of a vane chord length. The trailing-edge division line 46 extends to the rear sides 42 from a trailing edge of the fan exit guide vane 20, along a line made of the vane chord line of the fan exit guide vane 20 which is extended to the trailing-edge side, that is, along the streamline direction.

Moreover, the vane tip section 22 of the fan exit guide vane 20 is illustrated in FIG. 3B, and FIG. 3B also illustrates the coupling support member 32 and the like.

The vane tip section 22 of the fan exit guide vane 20 is held from both sides in the vane thickness direction by a pair of opposed walls 32a, 32b, which are parts of the coupling support member 32. Such opposed walls 32a, 32b are connected to the vane tip section 22 at multiple points (four points in FIG. 3B) by bolts and nuts. The coupling support member 32 including these opposed walls 32a, 32b is made of metal such as an aluminum alloy or a titanium alloy, and is connected to the fan case 5 via the mounting flanges 5a, 5a. It should be noted that while the coupling support member 30 and the like are not illustrated at the vane base section 21 of the fan exit guide vane in FIG. 3A, the vane tip section 22 is also held by opposed walls of the coupling support member 30, similarly to the vane base section 21.

Moreover, as illustrated in FIG. 3B, at the vane tip section 22 of the fan exit guide vane 20, a pair of the outer liners 50, 50 is made to butt against each other so as to clamp therebetween the fan exit guide vane 20 from the vane thickness direction, on a side inner than opposed walls 30a, 30b. The outer liner 50, similar to the inner liner 40, has an approximately rectangular shape consisting of a front side 51, a rear side 52, a pressure-side side 53, and a suction-side side 54. The pressure-side side 53 and the suction-side side 54 consist of abutting sections 53a, 54a, leading-edge sections 53b, 54b, and trailing-edge sections 53c, 54c, respectively.

The abutting section 54a on the suction-side side 54 of the outer liner 50 also has the curved shape along the surface shape of the suction side of the fan exit guide vane 20, in which a leading-edge side surrounds the leading edge of the fan exit guide vane 20 to slightly wrap around the pressure side. The other abutting section 53a on the pressure-side side 53 curves along the surface shape of the pressure side of the fan exit guide vane 20, except a portion where the abutting section 54a on the suction-side side 54 partially wraps around.

Moreover, in a state where the pair of the outer liners 50, 50 is made to butt against each other so as to clamp therebetween the fan exit guide vane 20, both the leading-edge sections 53b, 54b on the pressure-side side 53 and the suction-side side 54 are made to butt against each other so as to form a leading-edge division line 55, and both the trailing-edge sections 53c, 54c on the pressure-side side 53 and the suction-side side 54 are made to butt against each other so as to form a trailing-edge division line 56. The leading-edge division line 55 extends to the front sides 51 from the position offset from the leading edge to the pressure side of the fan exit guide vane 20, in parallel with the line made of the vane chord line of the fan exit guide vane 20 which is extended to the leading-edge side, that is, along the streamline direction. The trailing-edge division line 56 extends to the rear sides 52 from the trailing edge of the fan exit guide vane 20, along the line made of the vane chord line of the fan exit guide vane 20 which is extended to the trailing-edge side, that is, along the streamline direction.

Figure 4A:
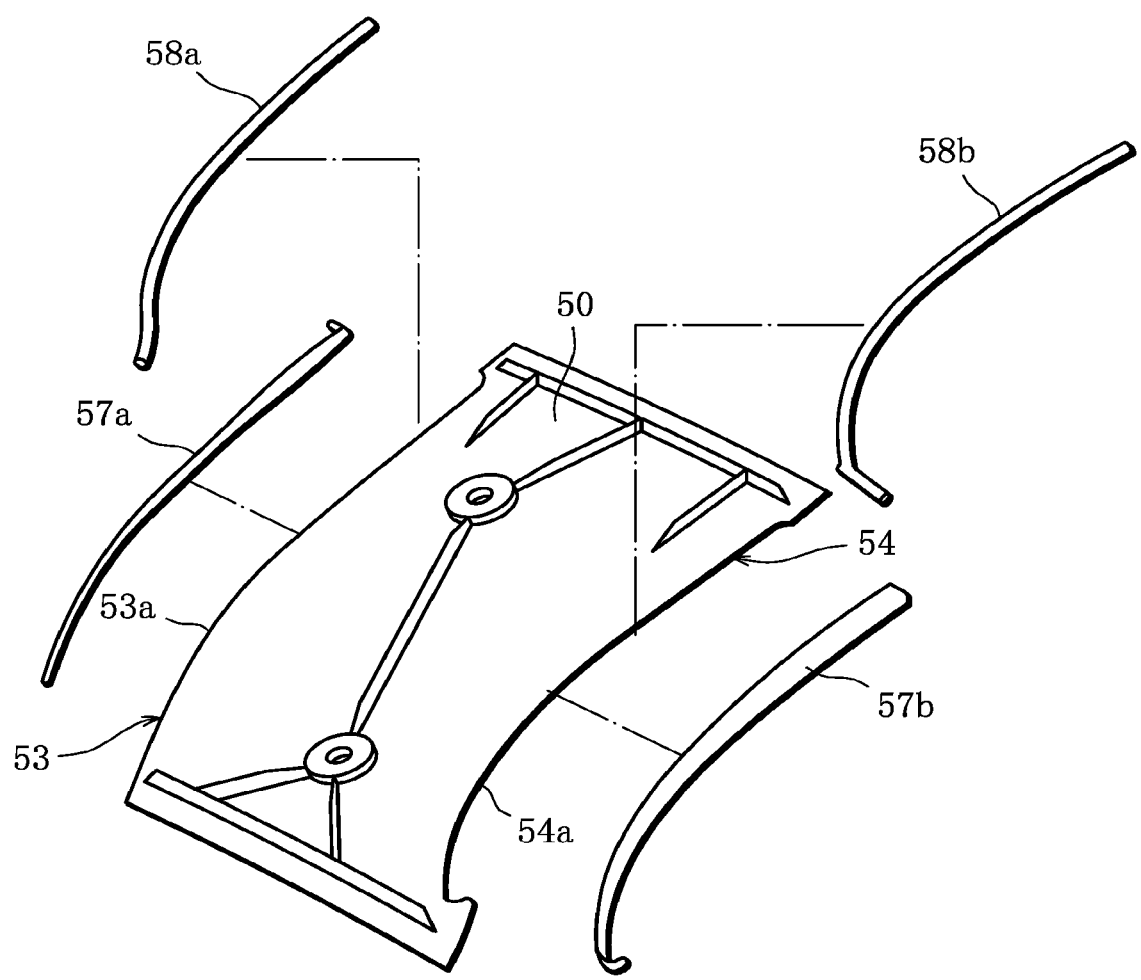
FIG. 4A is an exploded view of the vane tip section of the fan exit guide vane.
Figure 4B:
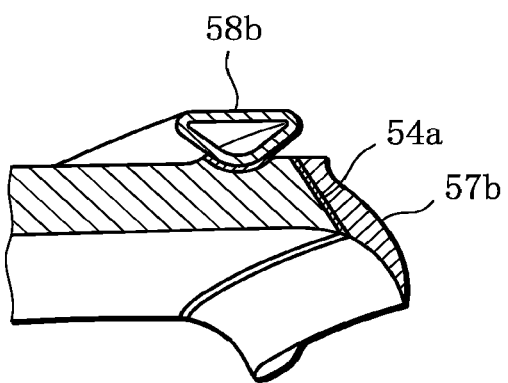
FIG. 4B is a cross-sectional view along an A-A line in FIG. 3B.

Furthermore, here, with reference to FIGS. 4A and 4B, FIG. 4A illustrates an exploded view of the vane tip section of the fan exit guide vane, and FIG. 4B illustrates a cross-sectional view along an A-A line in FIG. 3B.

As illustrated in detail in the exploded view of FIG. 4A, rubber fillets 57a, 57b are mounted on edge portions of the abutting sections 53a, 54a on the pressure-side side 53 and the suction-side side 54 of the outer liner 50, respectively, and tube seals 58a, 58b are mounted on outer edge portions of the abutting sections 53a, 54a on the pressure-side side 53 and the suction-side side 54.

The rubber fillets 57a, 57b and the tube seals 58a, 58b are made of elastic members, such as rubber, respectively, and are attached to the outer liner 50, for example, by an adhesive or the like. Then, as illustrated in FIG. 4B, the rubber fillets 57a, 57b extend toward the fan exit guide vane 20 so as to fill a gap between them and the fan exit guide vane 20. Moreover, the tube seals 58a, 58b are provided on an outside surface of the outer liner so as to fill a gap between them and the opposed walls 32a, 32b of the coupling support member 32. It should be noted that, although not shown, rubber fillets and tube seals are also provided on the inner liner 40, similar to the outer liner 50.

In this way, at the inner liners 40 and the outer liners 50, which form the bypass channel 6, since the leading-edge division lines 45, 55 are in parallel with the vane chord line of the fan exit guide vane 20 and along the streamline, the air flowing in the bypass channel 6 passes therethrough without traversing such leading-edge division lines 45, 55. Moreover, since the trailing-edge division lines 46, 56 are also along the vane chord line of the fan exit guide vane 20 and along the streamline, the air flowing in the bypass channel 6 passes therethrough without traversing such trailing-edge division lines 46, 56. Accordingly, even if a gap or a level difference is formed at the leading-edge division lines 45, 55 and the trailing-edge division lines 46, 56, occurrence of a vortex can be suppressed, and thus pressure loss can be reduced.

In particular, the leading-edge division lines 45, 55 are offset from the leading edge to the pressure side of the fan exit guide vane 20, and the abutting sections 44a, 54a on the suction-side sides 44, 54 of the inner liner 40 and the outer liner 50 surround the leading edge of the fan exit guide vane 20. Thus, the division lines do not exist at the leading edge of the fan exit guide vane 20 having significant aerodynamic influence, and influence of the pressure loss or the like may be minimized.

Furthermore, the inner liner 40 and the outer liner 50 are mounted on the fan exit guide vane 20 via the rubber fillets 57a, 57b, and mounted on the opposed walls 32a, 32b of the coupling support member 30, 32 via the tube seals 58a, 58b, respectively. Thus, the air does not exit from the gap, and the pressure loss can be more reliably reduced.

While the description of the present embodiment is ended here, the embodiment of the present disclosure is not limited thereto.

For example, while the fan exit guide vane 20 of the above described embodiment is provided in the bypass channel of the turbofan engine 1, the fan exit guide vane 20 can also be applied to stator vanes provided at other positions in the turbofan engine.

(Aspects of the Present Disclosure)

A first aspect of the present disclosure includes a fan case of a turbofan engine; an engine body section of the turbofan engine; multiple stator vanes that connect the fan case and the engine body section; and multiple liners that form a channel surface between end sections of the stator vanes that are adjacent to each other, wherein the liners that are adjacent to each other are made to butt against each other so as to clamp therebetween the stator vane, and a division line that is formed between the liners on a leading-edge side of the stator vane is along a streamline direction.

In a second aspect of the present disclosure, the division line between the liners extends to front sides of the liners from a position offset from a leading edge to a pressure side of the stator vane in the first aspect.

In a third aspect of the present disclosure, an amount of offset of the division line between the liners from the leading edge to the pressure side of the stator vane is more than or equal to 1.0% and less than or equal to 10.0% with respect to a vane chord length of the stator vane in the second aspect.

In a turbofan engine according to a fourth aspect of the present disclosure, a stator-vane structure according to any of the first to third aspects is employed as a stator-vane structure constituting the turbofan engine.

Explanation of Reference Signs 1 turbofan engine
2 engine body section
3 engine inner cylinder
5 fan case
5a mounting flange
6 bypass channel
10 rotor blade
20 fan exit guide vane (stator vane)
21 vane base section
22 vane tip section
23 sheath
30, 32 coupling support member
40 inner liner
41, 51 front side
42, 52 rear side
43, 53 pressure-side side
43a, 44a, 53a, 54a abutting section
43b, 44b, 53b, 54b leading-edge section
43c, 44c, 53c, 54c trailing-edge section
44, 54 suction-side side
45, 55 leading-edge division line
46, 56 trailing-edge division line
50 outer liner
57a, 57b rubber fillet
58a, 58b tube seal

The invention claimed is:

1. A stator-vane structure, comprising:
a fan case of a turbofan engine;
an engine body section of the turbofan engine;
multiple stator vanes that connect the fan case and the engine body section; and
multiple liners that form a channel surface,
a pair of the multiple liners that is adjacent to each other being made to butt against each other so as to clamp therebetween an end section of a stator vane of the multiple stator vanes, and
a division line that is formed between the pair of the multiple liners on a leading-edge side of the stator vane being parallel with a line, the line being made of a vane chord line of the stator vane which is extended to the leading-edge side.

2. The stator-vane structure according to claim 1, the division line between the pair of the multiple liners extending to front sides of the pair of the multiple liners from a position offset from a leading edge to a pressure side of the stator vane.

3. The stator-vane structure according to claim 2, an amount of offset of the division line between the pair of the multiple liners from the leading edge to the pressure side of the stator vane being more than or equal to 1.0% and less than or equal to 10.0% with respect to a vane chord length of the stator vane.

4. A turbofan engine comprising the stator-vane structure according to claim 1.

5. A turbofan engine comprising the stator-vane structure according to claim 2.

6. A turbofan engine comprising the stator-vane structure according to claim 3.

7. The stator-vane structure according to claim 1, a division line that is formed between the pair of the multiple liners on a trailing-edge side of the stator vane being parallel with a line, the line being made of a vane chord line of the stator vane which is extended to a trailing-edge side.

* * * * *